Sept. 22, 1959 R. P. HAWKINSON 2,905,436
TIRE SPREADER CONSTRUCTION
Filed Feb. 28, 1956
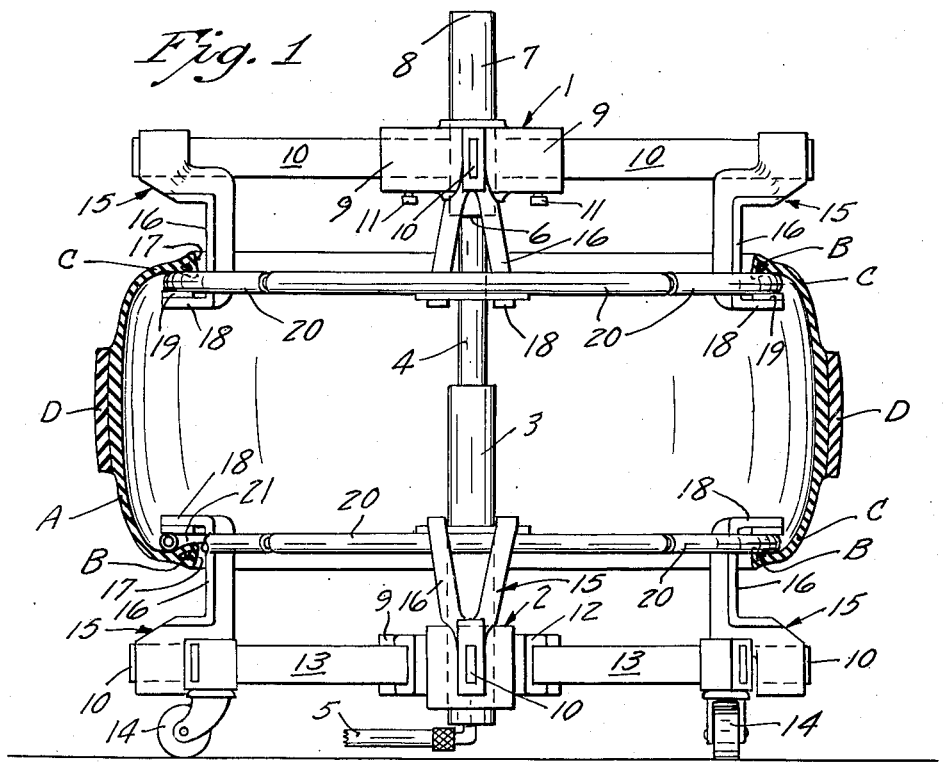
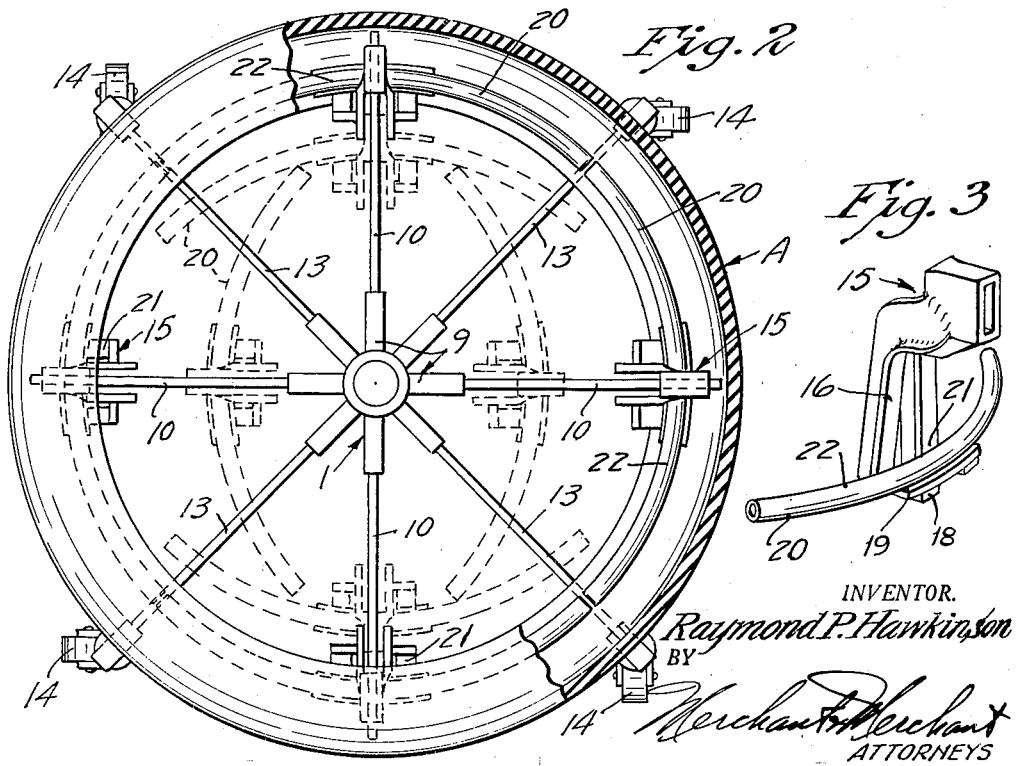
INVENTOR.
Raymond P. Hawkinson
BY
ATTORNEYS

United States Patent Office 2,905,436
Patented Sept. 22, 1959

2,905,436
TIRE SPREADER CONSTRUCTION

Raymond P. Hawkinson, Minneapolis, Minn., assignor to Paul E. Hawkinson Company, Minneapolis, Minn., a corporation of Minnesota Application February 28, 1956, Serial No. 568,258

6 Claims. (Cl. 254—50.3)

My invention relates generally to improvements in pneumatic tire spreaders and more particularly to the type incorporating a plurality of opposed pairs of circumferentially spaced bifurcated bead engaging hook members for which I substitute specially constructed shoes adapted to engage the opposite inner side wall surfaces adjacent the bead portions of a tire, whereby the entire tire is spread uniformly and simultaneously throughout its circumference without kinking or otherwise damaging the beads thereof.

Such tire spreaders are commonly used to spread the sidewalls of a tire casing by spaced engagement with the beads in order to reduce the same in circumferential dimensions in order that it may be entered into and removed from endless tire retreading bands or matrices. Such spreaders have uniformly been provided with circumferentially spaced tire bead engaging hook-type members which are relatively short in circumferential measurement. As a result, it has not been infrequent that the relatively rigid metal cores of the circular rim-flange engaging beads of the tire have been critically bent and actually fractured during the forceful spreading action. Particularly has this been true of heavy duty tires comprising a large number of cord plys.

With the advent of the tubeless tire, it has been increasingly more important that the continuous sealing surface as well as the relatively inflexible cores of the beads of the tire be not damaged during such forceful spreading operations, in order that the sealing qualities of the beads, with respect to their mounting rims, be not impaired.

The primary object of my invention is the provision of a novel spreader shoe of the type above described wherein means is provided for mounting and operating same from a bead-engaging-type tire spreading machine to spread a tubeless tire to its maximum extent without any direct contact of the shoes with the beads thereof.

Still more specifically, the object of my invention is the provision of a device in the class described wherein elongated arcuate tire spreading shoes are provided for engagement only with the interior sidewalls of the tire casing to be spread, without direct engagement with any portion of the tire bead proper.

A still further object of my invention is the provision of a device in the class immediately above described wherein the mounting means of each arcuate shoe is provided with an offset inner bracket portion so arranged as to position the tire spreading shoes radially outwardly of the beads, whereby the spreading force applied to the shoes is so distributed on the inner sidewalls of the tire only in spaced relation to the beads that no damage is occasioned to the bead or to the connecting cord structure of the sidewalls of the tire during spreading operations.

A still further object of my invention is a provision of a device in the class described in which the arcuate shoes are provided with cross sectionally arcuate inner side wall tire engaging surfaces whereby to provide a rolling engagement therewith outwardly of said tire casing beads during spreading movements thereof.

The above and still further objects of my invention will become apparent from the following detailed specification, appended claims and attached drawings.

Referring to the drawings wherein like characters indicate like parts through the several views:

Fig. 1 is a view partly in vertical section and partly in side elevation of my novel tire spreader showing same in use during spreading movements of a tire casing;

Fig. 2 is a view in top plan of the structure shown in Fig. 1 some parts being broken away and some parts being shown in section; and Fig. 3 is a perspective view of one of the tire engaging and spreading shoe carrying heads of my novel spreader, the same being slideably removed from its spreader arm.

Referring with greater particularity to the drawings, the numerals 1 and 2 indicate respectively a pair of upper and lower mounting members axially spaced along a common axis. Means is provided for supporting and guiding the mounting members 1 and 2 for relative movement longitudinally along the common axis, such means includes an axial recess in the lower member 2 which receives therein an upwardly opening axially extending sleeve 3 which telescopically receives a plunger 4 which may be upwardly axially extended by fluid under pressure introduced into the closed bottom of the sleeve 3 through an air line 5 from a source of pressure not shown. The extended upper end of the plunger 4 is adapted to be received within the open bottom 6 of an axial sleeve 7 on mounting member 1. Sleeve 7 has a closed top 8 limiting upward movement of the plunger 4 therebeyond.

Each of the mounting members 1 and 2 is formed to provide a plurality of radially outwardly opening sockets 9 which are spaced apart 90 degrees from one another and each of which is adapted to slideably receive therein a radially projecting spreader arm 10. Set screws or the like 11 are provided for locking spreader arms 10 in sockets 9 against accidental removal. It will be noted that the lower mounting member 2 is also provided with circumferentially spaced radially outwardly opening sockets 12 for the reception of circumferentially spaced radially extended supporting arms 13 which, as shown, are provided at their outer ends with caster wheels 14 for mobility. As seen in Fig. 2, the supporting arms 13 are spaced midway between the spreader arms 10.

Mounted for radially adjustable movements on the spreader arms 10 and 13 are tire spreading heads 15. It will be noted that the tire engaging heads 15 are each formed with C-shaped bracket members, those associated with the upper mounting member 1 extending downwardly and those associated with the lower mounting member 2 extending upwardly, whereby to provide cooperating opposed pairs of bracket members each carrying at its inturned free ends tire spreading shoes 20, later to be described. As shown in Figs. 1 and 2 the inner offset flange 16 of each C-shaped bracket member is adapted for normal engagement with the opposite bead portions B of a tire casing A to gauge and position the side wall engaging shoe 20 outwardly of the respective beads. The sidewalls of the tire casing A are identified by the letter C, whereas the newly applied tread material at the crown thereof is identified by the letter D.

As stated above the tire spreading shoes 20 of the heads 15 include generally axially extending first or stop offset flange portions 16, which are adapted to laterally and slidably engage the radially inner surfaces 17 of the beads B, to limit radial outward movements of the shoes 20 on the lateral free end portions 18 of the heads 15.

Heretofore, as shown in Hawkinson Patent 2,043,169 hook-shaped tire bead engaging heads were used for forceably spreading tire casings adapted to receive inner tubes. In such former types of tires damage to the beads was relatively immaterial. However, on the introduction of tubeless tire casings in which complete perfect circular air sealing is essential at the beads it was found that any out of true circular bending of the metal cores of the beads or even denting or scuffing of the surface portions thereof as was often produced by such hook end bead engaging structures, would destroy a casing for further use as a tubeless tire. In order to provide even greater lateral spreading of a tire casing as is often necessary and avoid any such damage to the bead portions B of the tire casing A during spreading movements thereof, I secure to the axially outer ends 19 of the second portions 18 of the C-shaped offset head brackets 16, elongated circumferentially extended spreader shoes 20, each of which comprises slightly less than 90 degrees of circular arc. It will be noted, particularly by reference to Figs. 1 and 3, that the arcuate shoes 20 are radially outwardly spaced from the offset flanges 16 of the heads 15 to provide cavities 21 for reception of the beads B of the tire A when the arcuate shoes 20 are moved into operative engagement with the inner sidewalls C of the tire casing A, immediately radially outwardly of the relatively rigid bead portions B. As shown, the arcuate shoes 20 are generally concentric with the axis of the tire casing A when in such operative position and extend substantially about the circumference of the tire casing A. In practice, I have found that the circumferential length of the plurality of the arcuate shoes 20 when in operative position is not less than 240 degrees of circular arc.

Preferably and as shown, the arcuate shoes 20 define cross-sectionally arcuate tire side wall engaging surface portions 22. This feature is important in that it brings about a rolling engagement therebetween and the sidewall of the tire to be spread, during spreading movements. As shown in Fig. 1, the arcuate shoes 20, associated with the upper mounting member 1 are located in the same horizontal plane. The same is true with the arcuate shoes 20 associated with the mounting member 2. Therefore, it is necessary that the tire engaging heads 15 are radially inwardly slideable on their respective arms 10 sufficiently to permit simultaneous movement thereof axially through the opening defined by the beads B of the tire A to be spread. See particularly dotted lines in Fig. 2.

In practice, the tire casing A is dropped over the lower spreading arms 10 and supporting arms 13 when the shoes 20 slideably mounted thereon are moved to the dotted line position of Fig. 2. Thereafter the upper mounting member 1 is dropped over the upper end of the plunger 4 as indicated in Fig. 1 while the tire engaging heads 15 are likewise in the dotted line position of Fig. 2. The tire engaging heads 15 are then slideably moved radially outwardly on their respective spreader arms so as to cause engagement between the offset stop flange portions 16 thereof and the inner surfaces 17 of the tire beads B. Spreading movements imparted to the mounting members 1 and 2 will cause the arcuate shoes 20 to move radially inwardly closer to the enlarged flexible bead portions B and consequently will move the portions 17 of the bead portions B away from the offset flanges 16 of the heads 15. Thereafter, the spreading action imparted to the tire sidewalls C through the arcuate shoes 20 will permit the inflexible bead portions B to move freely within the recesses 21 thereby leaving same free from engagement or possible damage. Furthermore, by this method of spreading, I have found that the tire casing A may be spread, and consequently contracted circumferentially, to a greater extent than is possible when the bead B of the tire A is engaged as in the past by hooks at circumferentially spaced points as heretofore referred to.

My invention has been thoroughly tested and found to be completely satisfactory for the accomplishment of the above objects, and while I have disclosed a preferred embodiment thereof, it should be specifically understood that same is capable of modification without departure from the scope and spirit of the appended claims.

What I claim is:

1. In a spreader device for spreading apart opposed sidewalls of a tire casing having a pair of mounting members disposed in axially spaced relationship along a common axis, means for supporting and guiding said mounting members for relative movement therebetween longitudinally along said common axis and spreader arms on each of said mounting members for spreading apart opposed tire casing sidewalls, the improvement comprising, in combination with said spreader arms, of a plurality of circumferentially spaced heads detachably secured to each spreader arm for radial adjustment thereon relative to said common axis, each of said heads having a substantially C-shaped bracket, an arcuate elongated spreader shoe connected between its ends across the outer free end portion of said bracket, and said bracket having an intermediate offset stop flange adapted to initially engage the axial inner face of a tire bead to limit radial movement of its respective head on its spreader arm, whereby to position each of said spreader shoes into engagement with the inner side walls of said tire outwardly of the tire beads when said spreader arms are moved apart.

2. The device defined in claim 1 in which the arcuate elongated tire casing sidewall engaging shoes are of such circumferential length that the sum of the length of the plurality thereof is not less than 240 degrees of circular arc when in said tire casing-spreading position.

3. The device defined in claim 1 in which there are not less than three pairs of cooperating heads.

4. The device as defined in claim 1 wherein each of said heads has a cavity intermediate the respective inner face and stop flange for freely accommodating a tire bead.

5. The device as set forth in claim 1 wherein each of said shoes are of arcuate configuration in axial cross-section.

6. In a power spreading device for pneumatic tires including a supporting structure carrying opposed pairs of circumferentially spaced spreader arms and means for simultaneously moving said pairs of arms in opposite directions, the improvement comprising, in combination with each said pair of arms of self gauging tire inner sidewall engaging heads radially adjustably mounted on said arms, each of said heads having a laterally offset bracket rigidly projecting from one side thereof, the free end portion of which extends substantially parallel with the adjacent spreader arm and laterally with respect thereto, and an arcuate elongated and transversely curved inner side wall engaging shoe rigidly connected across said free end portion of said bracket and extending to each side thereof in radially spaced relation to the intermediate offset portion of said bracket, whereby said intermediate portions of said brackets will initially receive and engage the inner axial surface of a tire bead at circumferentially spaced points thereon and position said arcuate elongated spreader shoes into rolling engagement with the inner side walls of said tire radially outwardly of the tire beads when said spreader arms are moved apart.

References Cited in the file of this patent

UNITED STATES PATENTS

| | | |
|---|---|---|
| 1,713,511 | Cadwallader | May 21, 1929 |
| 2,043,169 | Hawkinson | June 2, 1936 |
| 2,347,311 | Branick | Apr. 25, 1944 |
| 2,353,570 | Kraft | July 11, 1944 |
| 2,665,883 | Glynn | Jan. 12, 1954 |